Figure 1:
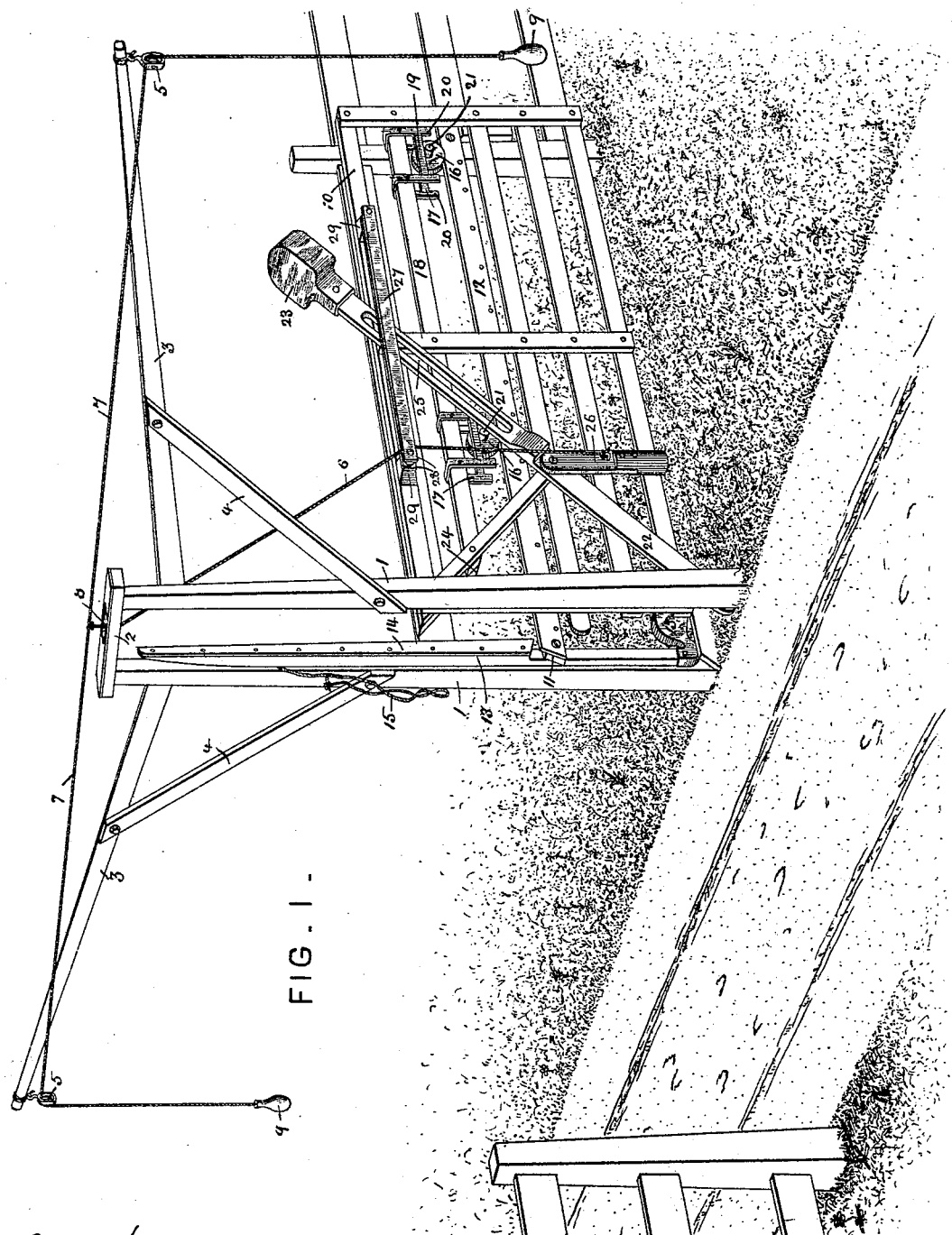

(No Model.) H. WITHEY. 2 Sheets—Sheet 1.
FARM GATE.

No. 459,472. Patented Sept. 15, 1891.

Attest:
Geo. T. Smallwood.
Percy B. Hills.

Inventor:
Henry Withey
By
Pennie & Goldsborough attys

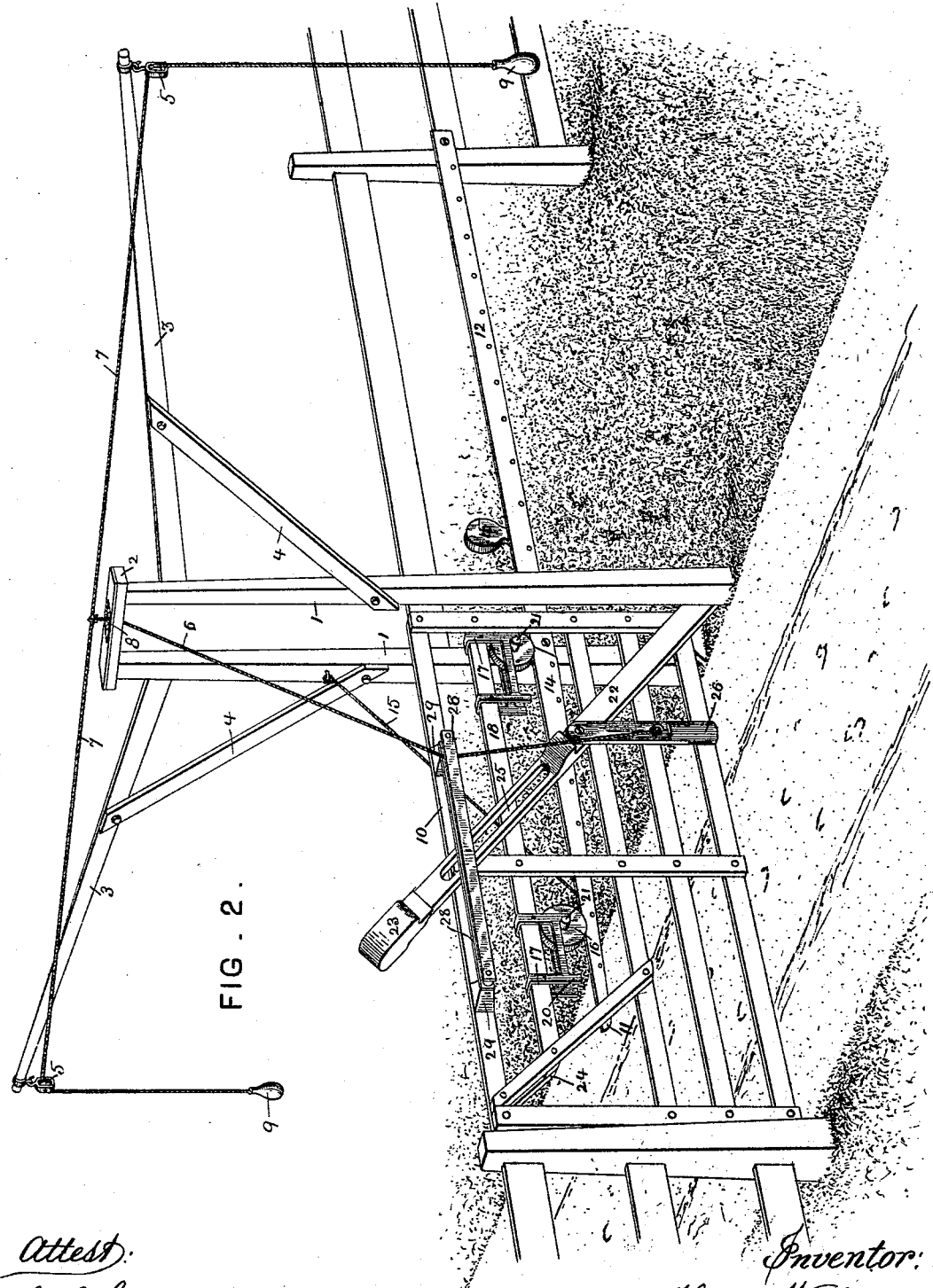

UNITED STATES PATENT OFFICE.

HENRY WITHEY, OF HASTINGS, MICHIGAN.

FARM-GATE.

SPECIFICATION forming part of Letters Patent No. 459,472, dated September 15, 1891.

Application filed April 25, 1891. Serial No. 390,376. (No model.)

*To all whom it may concern:*

Be it known that I, HENRY WITHEY, a citizen of the United States, residing at Hastings, in the county of Barry and State of Michigan, have invented certain new and useful Improvements in Farm-Gates; and I do hereby declare the following to be a full, clear, and exact description of the invention, such as will enable others skilled in the art to which it appertains to make and use the same.

My invention relates to improvements in the construction and operation of gates, and has special reference to sliding farm-gates for road and carriage ways.

The object of the invention is to provide a gate of this kind, which may be easily opened and closed from a vehicle or horseback without the annoyance of alighting or the danger consequent upon leaving the team to open and close the gate in the usual way. I attain these objects by the construction illustrated in the accompanying drawings, in which—

Figure 1 is a perspective view of the gate when open, and Fig. 2 is a similar view from the same side, the gate being closed.

In the drawings like numbers denote similar parts in the different views.

At one side of the gateway, in the position of the usual main gate-post, are erected two tall posts 1, located a sufficient distance apart for the gate and its operating device to play to and fro between them, and preferably connected together at the top by a cross-piece 2. Each of these posts is provided at or near its upper end with an outreaching crane-like arm 3, extending in the direction of the roadway, each arm being advisably braced by the diagonal brace 4. The purpose of these arms is to carry the branches of the cord, by means of which the gate is operated, and hold the ends in such position that they may be reached by any person driving up to the gate in a vehicle or on horseback, whether the gate be opened or closed. At the outer ends of the arms I usually mount small pulleys 5, through which the cord runs freely.

The main operating cord or rope is denoted by 6. It is connected at its lower end to mechanism for sliding the gate in either direction, (which will be presently described,) and at its upper end is connected to the branch cords 7, as shown in the drawings, being passed up through a guide-slot 8, cut in the top piece 2. The slot is preferably provided at its ends with small anti-friction rollers to insure the easy running of the cord, and the ends of the branch cords 7 are provided with weights 9 to keep the main cord and its branches drawn taut, the weights being suitably shaped to form handles.

The gate proper is denoted by 10. Except in the particulars hereinafter specified, it may be of any preferred form or construction. It is supported by and arranged to travel back and forth upon a guide-rail, one portion of which is stationary and mounted upon the panel of the fence adjoining the post 1, and the other is pivoted and adapted to project across the gateway in line with the fixed part, so as to form, when projected, a continuous guide-rail extending from the far end of the adjoining fence-panel across the gateway, or nearly so. In the drawings the fixed part of this guide-rail is denoted by 11. It is shown as having a metallic strip 12 firmly secured thereto, with its upper edge slightly above the edge of the rail and forming a track for the rollers on the gate to run on.

The movable part of the rail is denoted by 13. It consists of a strip of scantling pivoted near its rear end to or in line with the fixed part 11, and, like the latter, has a metallic strip 14, serving as a track for the gate-rollers. At its rear end this piece 13 is provided with a heavy weight 15, which causes the pivoted arm to assume and maintain a vertical position clear of the gateway, as shown in Fig. 1 when the gate is opened. Upon closing the gate the upper part of this arm is struck by a projection 24 on the gate and thrown down into line with the fixed rail, so that the gate may run off the fixed rail 11 onto the movable part 13. The abutting ends of the parts 11 and 13 at the hinge-joint are cut on a diagonal line, as shown in Fig. 1, so as to form a sort of butt or rule joint to hold the pivoted portion of the rail in line with the other part. Other re-enforcing means may be employed, if found necessary, to hold the rail 13 up under the weight of the gate.

In the drawings I have shown a cord or rope 15 connected at one end to the upper part of one of the posts 1 and at the other end to the rail 13 near its outer end. In lieu of this cord or in connection with it, if necessary, a suitable stop may be formed on the under side of the weighted end of the pivoted rail or the upper side of the fixed part of the rail beyond the hinge-joint.

I have shown in the drawings an arrangement of rollers for the gate to travel on. They are denoted by 16 and are preferably two in number, one being located at or near each end of one of the upper planks. These rollers are mounted in brackets 17, each bracket consisting, as shown in the drawings, of a pair of U-shaped irons inverted and straddled over the plank 18 and securely fastened in this position. The depending legs of the U-irons on either side of the gate are connected together by a small strip 19, forming a short track for the rollers to play on, and the ends of the legs extend down slightly below this strip to form stops 20 at the ends of the brackets to prevent the rollers running off. The rollers are provided with short gudgeons 21, projecting at either side, and are arranged in the brackets, as clearly shown in the drawings. They are grooved on their peripheries to prevent them from leaving the guide-rails, and are held in their places by the weight of the gate resting thereon. The object of this construction and arrangement of roller-brackets is to allow free and easy play to the rollers, especially as the gate is started and stopped.

Pivoted at or near the foot of one of the posts 1 is the radius-arm or operating-lever 22, constituting the immediate means for sliding the gate in either direction. This arm is provided at its upper end with a heavy weight 23, and is made of such length as to give sufficient leverage for operating the gate in either direction when thrown past its center by drawing on the operating-cord. The connection between the gate and the arm is preferably made by a stout pin on the former taking into a slot 25 in the latter. A pivoted link connecting the parts could, however, be used to advantage.

The means for throwing the weighted radius-lever from side to side is as follows: Were the main operating-cord 6 connected directly to the lever it would be impossible by pulling on the cord to throw the lever over to the opposite side of the vertical plane of its pivot. To accomplish this latter result I attach the end of the cord to a weighted arm 26, pivoted at its inner end upon the radius-lever, as shown, instead of connecting it to the body of the lever. This weighted arm 26 is arranged to swing freely, so as to be projected at right angles from one side or the other of the radius-lever under the control of the operating-cord, and its purpose is to throw said lever, when drawn into a vertical position, off its center to the opposite side of the vertical plane of its pivot, whence it falls to its lowest position on that side under the action of the weight at its upper end. A guide 27 is provided on the upper panel of the gate for the cord to play in, said guide consisting, in the form shown herein, of two narrow strips 28, secured to the outer ends of blocks 29, fastened to the top plank of the gate, sufficient space being left between the strips for the free play of the cord.

The projection on the gate which strikes and throws down the pivoted rail 13 is indicated at 24. It is here shown as a short inclined strip corresponding to one of the diagonal bracing-strips on the gate. This is, however, a mere matter of convenience, as any other form of projection is within the scope of the invention.

The construction and arrangement of parts being as thus described, the operation of the gate is as follows: The gate being closed, all the parts will occupy the positions shown in Fig. 2, the weighted radius-lever acting to hold the gate in its closed position, as will be readily understood. It being now desired to open the gate, a pull on either branch 7 of the operating-cord raises the radius-lever to a vertical position, pulling the gate half-way open. The further opening of the gate is designed to be entirely automatic, being due to the leverage of the weighted radius-bar falling by its own weight from the vertical position above referred to and pushing the gate with it. The first effect of drawing on the operating-cord is to pull the pivoted weighted arm 26 up and inward toward the post 1 to the opposite side of the radius-lever, which then moves up to a vertical position under the pull of the cord 6. In pulling the lever up to this position the arm 26 will be carried to the opposite side of the vertical plane of the lever's pivot, and by its weight will throw the lever itself past the dead-center of its vertical position, whence it falls by gravity until the gate reaches its rearmost position fully opened. To close the gate it is only necessary to pull on the opposite branch of the operating-cord, when the above-described operation will be repeated, the parts moving in the opposite directions.

Upon reference to Fig. 1 it will be noted that when the gate is closed it is supported mainly, if not entirely, by the pivoted rail 13. As the gate is slid to the open position by the means above described and the rollers run off the pivoted rail on the fixed rail 11, the weighted rear end of the pivoted rail overbalances its forward end, and it rises to the vertical position shown in Fig. 1, leaving the gateway clear. During the first part of the closing movement of the gate the upstanding part of the pivoted rail is struck by the projection 24 on the gate and thrown down into a horizontal position across the gateway and in line with the fixed part 11. This pivoted rail is an important feature of my invention, enabling me to dispense with the usual rearward projections from the gate and to lighten up the structure and insure easier, quicker, and more certain action of the parts. The weighted radius-lever and the means for throwing it past the center are also distinctive features of the invention. In these and other respects I wish it understood that I do not regard the invention as restricted to the details of the organization shown, it being obvious that the scope of the invention admits of considerable modification in the construction and arrangement of these parts without departing from the spirit of the invention itself.

Having thus fully described my invention, what I claim, and desire to secure by Letters Patent, is—

1. In a sliding-gate-operating mechanism, the combination of an operating-lever pivoted at its lower end, a weight carried by the lever, and a connection to the weight and lever, whereby in opening or closing the gate the weight is shifted from side to side of the lever, so as to throw said lever past the center, substantially as described.

2. In a sliding-gate-operating mechanism, the combination of an operating-lever pivoted at its lower end, a weighted arm pivotally connected with the lever, and an operating-cord for the lever connected to the weighted arm, substantially as described.

3. In a sliding-gate-operating mechanism, the combination of a weighted operating-lever pivoted at its lower end at a point between the two positions of the gate and connected at its upper part with the gate, a weighted arm pivotally connected with the lever and adapted to swing to either side of the same, and an operating-cord connected to the pivoted arm, substantially as described.

4. The combination of a sliding gate and a track-rail for the gate to run on, one portion of the rail being fixed at the side of the gateway and the other portion being pivoted at a point between its ends and adapted to be struck by the gate in closing and depressed into a horizontal position, extending across the gateway in line with the fixed part, the rear end of the pivoted part of the rail being weighted, whereby the part projecting across the gateway rises automatically to clear the way when the gate is run onto the fixed part of the track in being opened, substantially as described.

5. In a sliding-gate-operating mechanism, the combination of the posts 1, the outreaching arms 3, the gate 10, the pivoted operating-lever 22, the fixed track-rail 11, the pivoted track-rail 13, the weighted arm 26, pivoted to the operating-lever, and an operating-cord 6, connected at one end to the arm 26, passing through a guide at the top of the posts and having branches 7 at its other end extending out along the arms 3, with their ends depending over the roadway, substantially as described.

6. The combination of the vertical posts 1, the cross-piece 2, connecting them together at the top, the out-reaching arms 3, the fixed track-rail 11, the pivoted track-rail 13, weighted at its rear end, the sliding gate 10, with rollers 16, the weighted lever 22, pivoted at the foot of the posts 1 and connected with the gate at its upper part, the weighted arm 26, pivoted to the operating-lever, and the operating-cord 6, connected to the arm 26 and passing through a guide at the top of the posts and having branch cords 7 running out along the arms 3, with their ends depended over the roadway, substantially as described.

In testimony whereof I affix my signature in presence of two witnesses.

HENRY WITHEY.

Witnesses:
CLEM SMITH,
PHILIP T. COLGROVE.